Jan. 3, 1956  M. G. McCOOL ET AL  2,729,100
WELL DRILLING RECORDER
Filed Aug. 10, 1953  3 Sheets-Sheet 1

Marcus G. McCool, and
Charles O. Moorhead
INVENTORS,

BY
Bernard P. Miller
ATTORNEY

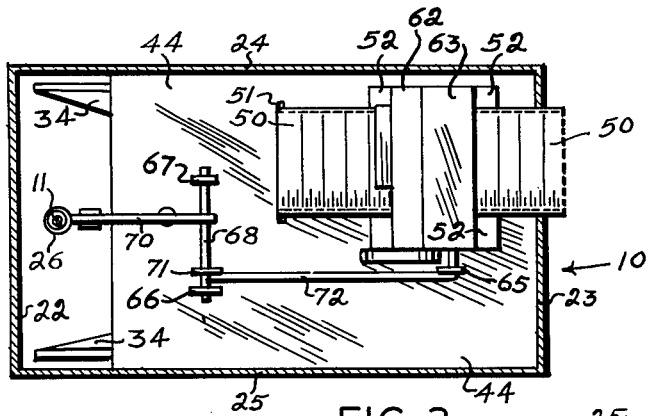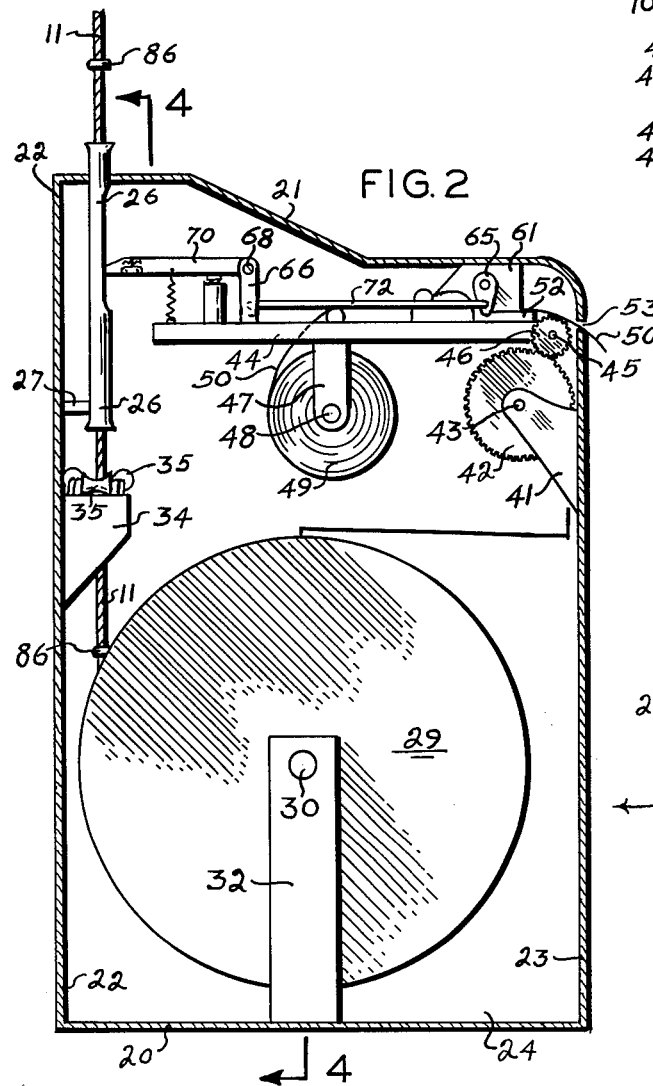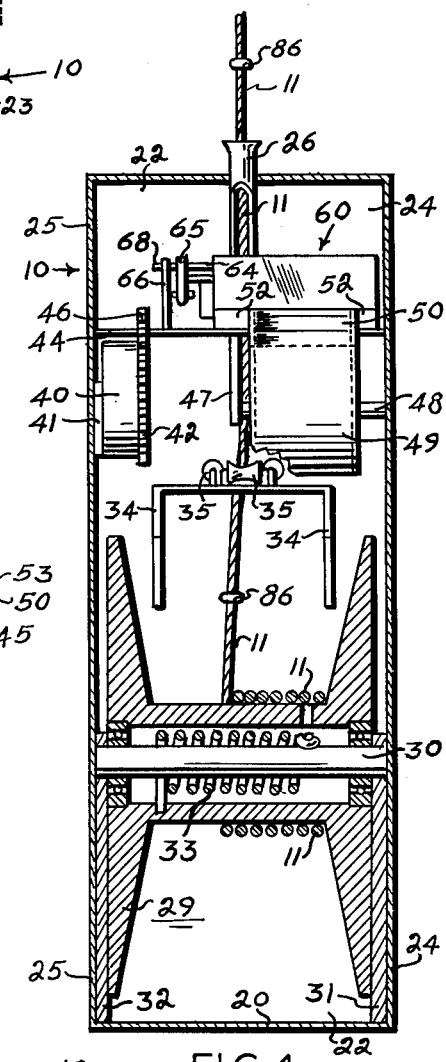

Jan. 3, 1956

M. G. McCOOL ET AL 2,729,100

WELL DRILLING RECORDER

Filed Aug. 10, 1953

Marcus G. McCool, and
Charles O. Moorhead
INVENTORS,

BY
Bernard P. Miller
ATTORNEY

United States Patent Office 2,729,100
Patented Jan. 3, 1956

2,729,100
WELL DRILLING RECORDER

Marcus G. McCool and Charles O. Moorhead,
Oklahoma City, Okla.

Application August 10, 1953, Serial No. 373,282

8 Claims. (Cl. 73—151.5)

The present invention relates to rotary well drilling rigs or apparatus, and more particularly to mechanism for recording drilling progress.

The principal object of the present invention is to provide a mechanism which will automatically keep a record, calibrated in terms of time, indicating how fast the drill-bit is descending during the drilling operation; the amount of time consumed in withdrawing the drilling string from the well and in re-introducing it into the well; and shut-down time.

A further object is to provide a mechanism of this class which will eliminate any chance of error in the record which might be caused by line slippage over a record making pulley.

The present mechanism is particularly designed as an improvement over a "Depth Recorder for a Well Drill" upon which United States Letters Patent Numbered 2,096,995 was originally issued to George P. Mizell on October 26, 1937, and from which Reissue Patent Numbered 21,297 issued to said Mizell on December 12, 1939.

The mechanism of the present invention is so designed that there is no recording pulley or sheave, such as the pulley 40 of the Mizell patent. By eliminating said pulley and any mechanical equivalent thereof, applicants have been able to eliminate any chance of error due to possible recording line slippage with relation to said pulley.

It is therefore an import object of the present invention to provide a recording mechanism of the class described which is positive in operation, and dependable under all weather conditions.

Another object is to provide a recording mechanism of this class which is comparatively simple in construction and is comparatively cheap to manufacture.

Other objects will be apparent from the following description when taken in conjunction with the accompanying three sheets of drawings, wherein:

Figure 2 is a vertical sectional view through the mechanism housing, and showing the mechanism in side elevation;

Figure 3 is a horizontal sectional view through the mechanism housing, and looking downwardly upon the top of the mechanism;

Figure 4 is a vertical sectional view taken substantially along the staggered line 4—4 of Fig. 2;

Like characters of reference designate like parts in those figures of the drawings in which they occur.

Figures 1, 8:
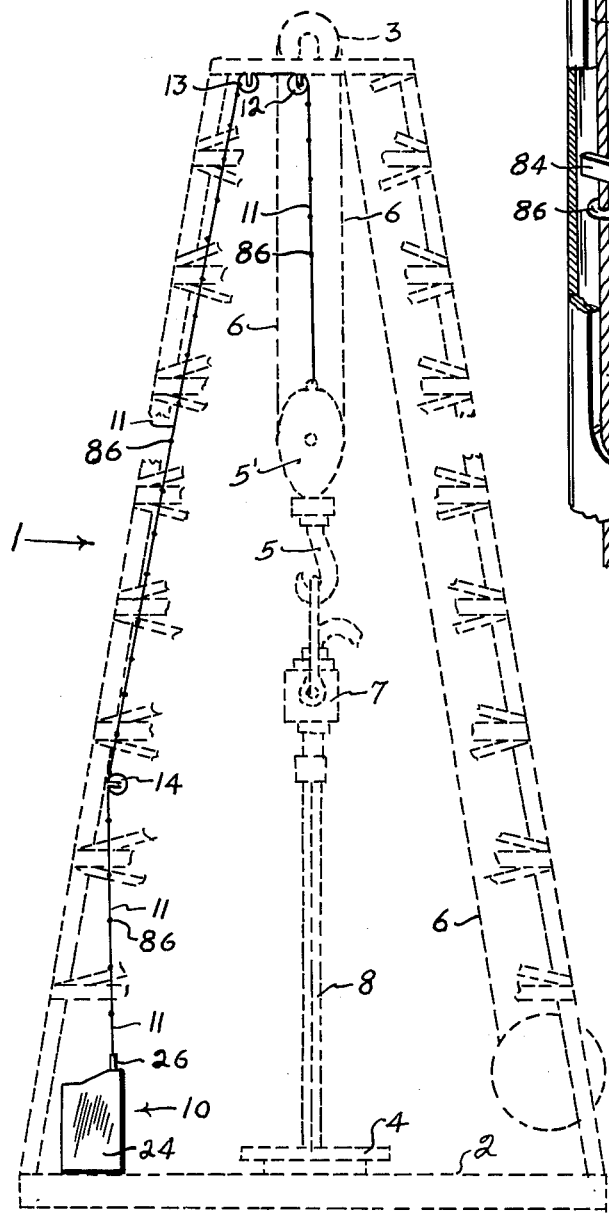
Figure 1 is a dotted line side elevational view of a conventional rotary well drilling derrick, the recording line and the mechanism housing of the present invention being shown in solid lines.
Figure 8 is an enlarged fragmentary perspective view detailing the relationship of the recording line and one end of the recording arm.

Referring now more particularly to Fig. 1 of the drawings, the reference numeral 1 indicates, as a whole, a conventional derrick of a rotary well drilling rig, said derrick having a floor 2, a crown-block 3 at its top, a rotary table 4 projecting above the floor 2, a traveling-block 5' supported by the crown-block 3 and adapted to be raised and lowered on a cable 6, a swivel 7 supported by the traveling-block 5', and a vertical pipe or stem section 8 supported by the swivel 7. The stem section 8 is the uppermost section of a drilling string which extends downwardly into a well, not shown, said string having a drill-bit on its lower end. The above described equipment is all conventional to rotary well drilling rigs, and so far as it is pertinent to the present invention, it is only necessary to know that the drilling string, the swivel, and the traveling-block all move downwardly simultaneously, as the well is drilled deeper.

The mechanism of the present invention is most of it enclosed within a housing 10 suitably located at some desired point within or near the derrick 1. That portion of the present mechanism which is not confined within the housing 10, consists substantially of a recording line 11 which has one end attached to the traveling-block 5'. The line 11 extends upwardly from the traveling-block 5', is trained over suitable sheaves or pulleys 12 and 13, and is then brought downwardly in the derrick to enter the housing 10, as is more fully described hereinbelow. Suitable other pulleys or pulley 14 may be employed to properly train the line 11 down to the housing 10.

Figure 1 illustrates the line 11 as being attached to the traveling-block 5'. Such an arrangement is probably the most practical, but the line 11 could be connected directly or indirectly to any element of the drilling equipment which descends with the drilling string, as the well is deepened. In other words, the line 11 could well be connected with the swivel 7, or by furnishing proper fittings, it might well be connected with the drilling string, per se.

The housing 10 may be of any desired configuration, is preferably made of sheet metal, and should be weather tight, if it is located out of doors. The type of housing shown in the drawings is substantially rectangular in configuration, having a floor 20, a top 21, a vertical front wall 22, a parallel rear wall 23, and vertical side walls 24 and 25. When viewing the housing from the front, the side wall 24 is on the left hand and the wall 25 is on the right hand of the viewer.

Adjacent the front wall 22 and approximately half way between the two side walls 24 and 25, the top 21 is perforated to receive the upper end portion of a line guiding tube 26 which is rigidly anchored in a vertical position by being welded to the top 21, and also by a horizontal bracket or brace 27 engaging the lower portion of the tube and also the front wall 22. The innermost wall of the tube 26 is cut away to provide a vertically extending longitudinal slot or opening 28. The above mentioned measuring line 11 extends downwardly through the tube 26, and therebelow is attached to a rotatable drum or reel 29 to be wound thereon as shown in Fig. 4.

The reel 29 is rotatably mounted on a horizontal shaft 30 having its ends rigidly mounted in supporting legs 31 and 32 mounted on the floor 20 adjacent the side walls 24 and 25 respectively. The central portion of the drum or spool 29 is hollow, and houses a suitable coiled spring 33 which surrounds the shaft 30 and is arranged to rotate the drum in counterclockwise direction.

Between the lower end of the tube 26 and the spool 29, the front wall 22 is provided with a suitable shelf 34 which rotatably supports four rollers 35, for guiding the line 11 in its travel after it leaves the tube 26 and before it reaches the spool 29. The rollers 35 are arranged so that they completely surround the line 11 and control its lateral movement to the extent that it does not bind with tube 26.

As may be seen from Figs. 1 and 2, when the drilling string descends in the well, and the traveling-block 5' descends therewith, the line 11 is pulled downwardly through the guide pulley 12. This downward movement of the line pulls upwardly on that portion of the line which is within the tube 26, and also unwinds the line from the spool 29 with the spool being forced to rotate clock-wise against the action of the spring 33.

Operation of the recording mechanism of the present invention is controlled by the longitudinal movement of the recording line 11. Since the line 11 is moved longitudinally only to the extent that the drilling string is moved downwardly due to the further deepening of the well by the drill bit on the lower end of the tool string, the line 11 will be moved upwardly through the tube 26 the exact distance and at the same speed that the well is deepened. It is therefore obvious that a recording mechanism which interprets movement of the line 11 in terms of elapsed time, will be capable of depicting drill bit progress in terms of elapsed time. If such recording mechanism is controlled directly by recording line movement, without the presence of any mechanical elements which might be detrimentally effected by line slippage, then an accurate and dependable record can be made. Such a recording mechanism is provided within the housing 10, as is fully described hereinbelow.

The recording mechanism includes a conventional spring driven gear train or clock mechanism 40 which is supported on the rear wall 23 by two spaced rigid brackets 41, and which is adapted to rotate a toothed gear 42, by first driving a horizontal shaft 43 (Fig. 2), upon which the gear 42 is keyed.

Supported between the two side walls 24 and 25 is a horizontal shelf 44 which lies just above the upper periphery of the gear 42. Adjacent the rear wall 23 of the housing, the shelf 44 rotatably supports a horizontal shaft 45 to which are keyed or otherwise rigidly attached gear 46 and two spaced apart gears (not shown) which are identical to each other. The gear 46 is driven by the gear 42.

The table 44 has a rigid depending bracket 47 which supports a removable horizontal axle 48, the other end of which is supported by a perforation in the housing wall 24. The axle 48 rotatably supports a roll 49 of printed paper tape 50. The tape 50, after it leaves the roll 49, is passed upwardly through a slot 51 in the shelf 44 from which it extends along the upper surface of the table and flatly over a block or anvil 52. After passing over the anvil 52, the tape 50 passes over the two spaced gears on shaft 45, which engage within rows of spaced perforations along the side edges of the tape. These two gears on shaft 45 thereby act as a means for unreeling the tape from the roll 49, and also act to eject the end portion of the tape from the housing through a suitable slot 53, which is cut through the wall 23 thereof. The gear train and tape arrangement is such that the tape is propelled across the anvil 52 at a constant rate of speed, said rate being co-related to the printed cross-lines on the tape. In other words, the tape 50 bears spaced apart cross-lines printed thereon, and the tape is driven at a speed at which a predetermined number of such lines will pass a given point on the anvil 52 in one hour of elapsed time.

The table 44 further supports operative mechanism which acts to record or indicate on the tape, the amount or length of the recording cable 11 which passes upwardly past a given vertical point in the line guiding tube 26. Since, as above set forth, the recording line 11 is moved upwardly through the tube 26 only by downward movement of the drilling string 8 in the well being drilled, the tape 50 may therefore be made to accumulate an accurate record of drilling progress in terms of elapsed drilling time. The data accumulated on the tape 50 can be accurate, only to the extent that the upward movement of the cable 11 through the tube 26 is accurately recorded on the tape. Should there be any lost motion or slippage in the recording mechanism between the cable 11 and the point on the traveling tape where the marking occurs, then the data accumulated on the tape will obviously be inaccurate.

The tape marking mechanism, or in other words, the recording mechanism will next be described hereinbelow.

This tape marking mechanism consists substantially of a rigid hollow frame 60 having substantially identical upstanding parallel end walls, one of which is shown in the drawings, and which is indicated by the reference numeral 61. The upper edges of these two vertical end walls of the frame 60 are rigidly connected by horizontal brace plates 62 and 63 which may well be made integral with said end walls. The frame 60 is rigidly connected to the upper surface of the table 44 in any desired manner, and the frame is so located that the plates 62 and 63 lie spacedly above and extend across the anvil 52. The two end walls of the frame are spaced apart a sufficient distance to permit the free passage therebetween of the tape 50 before it reaches its propelling gears that are on shaft 45.

The two end walls of the frame 60 are alignedly perforated transversely to journal a rock-shaft 64, having one of its ends extending slightly beyond the outer surface of the end wall 61, and to this projecting end portion of the rock-shaft 64 is rigidly keyed one end of a crank-arm 65.

Adjacent that end of the shelf 44 which lies nearest the line guiding tube 26, the upper surface of the shelf is provided with two spaced vertical posts 66 and 67 which are alignedly perforated transversely to rigidly support a horizontal shaft 68. With its corner portion pivotally mounted on the shaft 68, there is provided a substantially L-shaped crank-arm 69 having one straight leg 70 which normally resides in a horizontal position, and having a shorter straight leg 71 which extends downwardly, and which lies at right angles to the leg 70. The lower end of the leg 71 is perforated to receive one end of a straight rigid horizontal link 72, the other end of which is engaged in a perforation in the lower end of the above mentioned crank-arm 65 which is keyed to the shaft 64. Both ends of the link 72 are pivotally engaged in the respective crank-arms 69 and 65, and the link is of such a length, that the leg 71 and arm 65 may both be in vertical positions at the same time.

Figure 5:
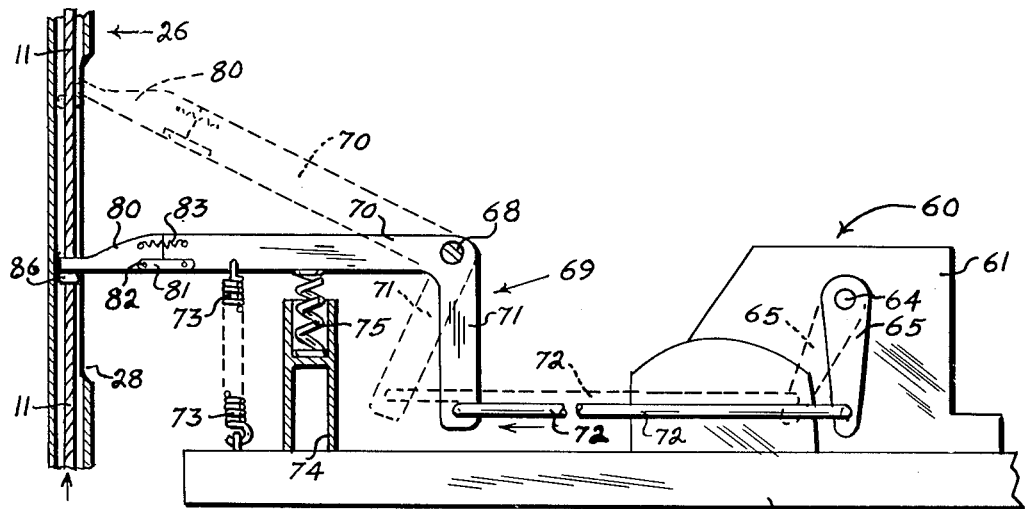
Figure 5 is an enlarged fragmentary side elevational view illustrating a recording arm and its associated equipment, which all form a portion of the invention, the dotted lines illustrating an operative movement of the arm and said equipment.
Figure 6:
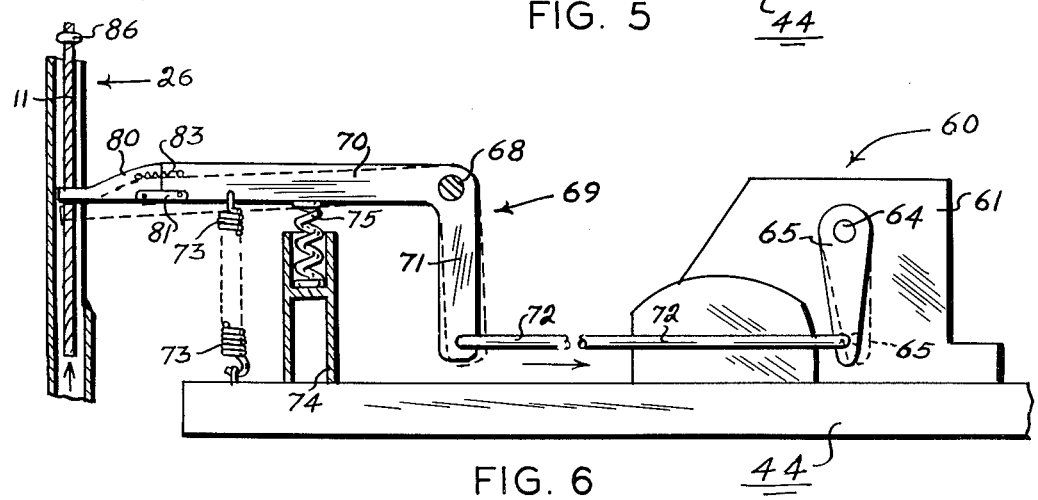
Figure 6 is a similar view of the same mechanism, but illustrating in dotted lines another operation.
Figure 7:
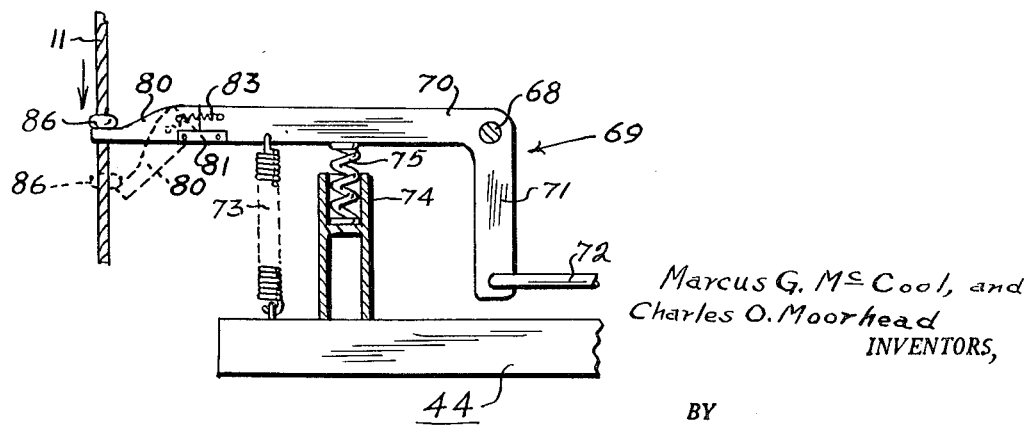
Figure 7 is a fragmentary side elevational view of said arm and illustrating in dotted lines another operation thereof.

A coiled retrieving spring 73 has its upper and lower ends respectively engaged with the outer end portion of the crank leg 70 and the upper surface of the shelf 44 so that the leg is resiliently urged in a downward direction. A tubular post 74 is positioned on the shelf 44 beneath the leg 70, and a coiled bumper spring 75 is seated in the post 74 to dampen the shock of any rapid downward movement of the leg 70. The spring 75 and post 74 are complementally of such a length that the leg 70 is normally held in a horizontal position as best illustrated in Figs. 5, 6 and 7. The bumper spring 75 is stronger than the retrieving spring 73, and therefore, the spring 73 cannot pull the leg 70 below its horizontal position.

The mechanism may be so located upon the shelf 44 that the lower leg 71 of the crank-arm 69 is in alignment with the crank-arm 65 on the shaft 64 (Figs. 5 and 6), thereby allowing the link 72 to extend between the two, or if found desirable, the legs 70 and 71 may be separated and arranged as illustrated in Fig. 3, wherein the right hand end of the leg 70 is anchored to the shaft 68, and the upper end of the leg 71 is also connected rigidly to the shaft 68 but is off-set laterally from the leg 70. When such an alternative arrangement is used, the mechanical action is the same, since the leg 70, shaft 68, and leg 71 merely combine to form a bell-crank. The bell-crank has the same mechanical action as the crank-arm 69.

Figure 11:
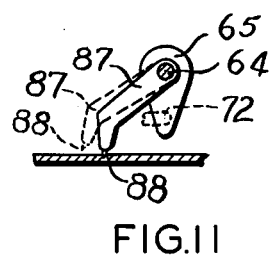

From the above description of the arrangement of the two crank-arms 65 and 69, and the link 72, it is readily apparent that upward movement of the outer end of the leg 70 acts to move the arm 65 in the manner illustrated in dotted lines in Fig. 5. Since the upper end of the arm 65 is anchored on the shaft 64, it is also apparent that swinging movement of the arm 65 acts to rock the shaft 64. Since the shaft 64 extends horizontally across the traveling tape 50 above the tape and the anvil 52, some sort of a depending marking arm could well be anchored to the shaft 64 above the tape, so that when the shaft is rocked, the marking arm will make a mark upon or an imprint in the surface of the tape 50. Such a tape marking arrangement is illustrated in Fig. 11, and is more fully described hereinbelow.

The outer end of the leg 70 is provided with a short section 80 which is hinged thereto in such a manner that the section normally forms a straight continuation of the leg, but in a manner permitting the section to be swung downwardly as illustrated in dotted lines in Fig. 7 should downward pressure be applied to its outer end. The type of hinge connection provided to so mount the leg section 80 may well consist of two metal cleats which are attached flatly to the two side surfaces of the leg 70 to project longitudinally therebeyond. One of such two identical hinge cleats is shown in the drawings and is indicated by the reference numeral 81. The outer ends of these two hinge cleats are alignedly perforated transversely to receive a pivot pin 82. The pin 82 passes through the inner end portion of the leg section 80 to pivotally mount the same to swing in a vertical path. A retrieving spring 83 engages the section 80 and the leg 70 to normally hold the section in axial alignment with the leg. The outermost end of the section 80 is bifurcated to provide two longitudinally extending tines 84 and 85 which extend into the opening 28 in the side of the guide tube 26, and which straddle the line 11 (Fig. 8).

As illustrated in Figs. 1, 2, 3, 4, 5, 6, 7 and 8, the line 11 is provided with equidistantly spaced enlargements 86 which may be in the form of smooth metal beads firmly attached to the line in any suitable or desired manner, not shown. The beads or lugs 86 are so large in diameter that they cannot pass between the tines 84 and 85 of the leg section 80. Consequently, as the line 11 travels upwardly through the tube 26, the leg section 80 and the leg 70 are raised to the dotted line position of Fig. 5 each time one of the lugs 86 engages the lower surfaces of the tines 84 and 85. When such lug passes upwardly beyond the reach of the tines, the section 80 and leg 70 are abruptly released to the action of the retrieving spring 73. The spring 73 thereupon exerts a violent downward pull on the leg 70 which causes the leg to strike an abrupt and forcible blow upon the upper end of the bumper spring 75. This downward blow of the leg 70 is sufficient to, for an instant, overcome the inherent resiliency of the spring 75 and permit the leg 70 to pass slightly below its normal horizontal position which is best illustrated in solid lines in Figs. 6 and 7. The downwardmost position thus reached by the leg 70 is illustrated in dotted lines in Fig. 6, and the dotted lines in said Fig. 6 further show the positions assumed by the leg 71 and the crank-arm 65 when the leg 70 reaches this downwardmost position. Of course, the bumper spring 75 acts to immediately return the leg 70 to its normal horizontal position after the leg 70 has once dropped to its lowermost position.

At any time the line 11 is moved downwardly in the tube 26, contact of one of the beads 86 with the upper surfaces of the tines 84 and 85 will act to automatically swing the leg section 80 in a downward direction as shown in dotted lines in Fig. 7, without in any manner moving the leg 70. The beads 86 may therefore pass downwardly through the tube 26 without effecting the recording mechanism.

The tape marking mechanism of Fig. 11 is arranged to make an impression on the tape 50 only at each time the leg 70 is dropped to its lowermost position, as above described.

This tape marking mechanism, as above mentioned, operates through the rocking movement of the rock-shaft 64. The shaft 64 is provided with a rigid downwardly projecting marking arm 87 having a hardened lower die-edge 88 adapted to strike the upper surface of the tape 50 each time the shaft 64 rocks in a counter-clockwise direction beyond its normal radial position. This occurs only at such time as the leg 70 drops below its normal horizontal position. Consequently, the tape 50 will be marked by the die 88 only at such time as one of the beads 86 on the line 11 disengages the tines 84 and 85 of the leg section 80, during upward movement of the line through the tube 26. Such tape marking will occur upon the upward passage of each of the beads 86 beyond the reach of the tines.

Since the operation of the various parts of the apparatus of the invention have been described from time to time hereinabove, as the description of the mechanics has progressed, it is thought that the general operation of the apparatus has been fairly well disclosed.

It is, however, stated: that the tape 50 continuously progresses across the anvil 52 at a timed rate of speed; that the line 11 passes upwardly through the tube 26 only in accordance with the downward movement of the drilling tools in the well; that the beads 86 on the line 11 are spaced apart equal measured distances (for instance, one bead to each foot of line); that the tape marking element is actuated once only for each time one of the beads passes a given point in its upward travel through the tube 26; and, that the traveling tape is therefore caused to accumulate data concerning the speed of the drilling operation.

Figure 9:
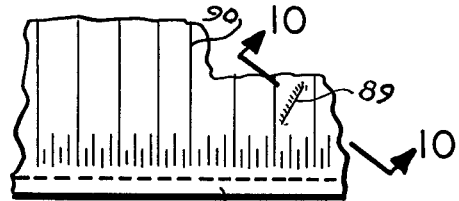
Figure 9 is a fragmentary top view of a recording tape which constitutes a portion of the mechanism.
Figure 10:
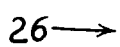
Figure 10 is a fragmentary vertical sectional view taken substantially along the line 10—10 of Fig. 9; and, Figure 11 is a fragmentary elevational view detailing a tape marking element which constitutes a part of the device.

It is further pointed out: that the tape 50 is gear driven, and therefore the drive is positive with no chance of any slippage; that the operative connections between the tines 84—85 of the leg section 80, and the tape marking die 88 on the arm 87, are positive in arrangement, so that there can be no lost motion in the movements of such operative connections, and therefore, when one of the beads 86 passes upwardly beyond reach of the tines, there is no question that the die 88 will instantly strike and mark the traveling tape. One type of such a mark is a crease 89 (Figs. 9 and 10). Suitable time representing lines or graduations on the tape 50 are indicated by the reference numeral 90 (Fig. 9).

It is further to be noted that the line, bead, and tine arrangement is such that there is no possibility of one of the beads 86 passing upwardly through the tube 26 without the outer end of the leg 70 being moved upwardly thereby.

In view of the disclosures made hereinabove and those shown in the accompanying drawings, it is thought that apparatus has been provided which will accomplish all of the objects and purposes set forth.

Obviously the invention is susceptible to some change or alteration without defeating its practicability, and we therefore do not wish to be confined to the preferred embodiment shown in the drawings and described herein, further than we are limited by the scope of the appended claims.

We claim:

1. In drilling recording apparatus for rotary well drilling rigs, the combination of: a recording line having one end connected to a well drilling tool string to move vertically therewith as the well is deepened; deformities carried by the line at measured spaced distances apart; a rockably mounted lever-arm mounted adjacent one extent of said line; a fork carried by the lever-arm and straddling said line in the path of said deformities, whereby the lever-arm is rocked each time a deformity moves the fork in a given direction; means biasing the lever-arm to a normal unrocked position, whereby the lever arm is returned to normal position after being deflected by a deformity; a movable sheet marking arm connected to said lever-arm; a movable sheet having time representing graduations thereon, said sheet having an extent lying in position to be marked by said marking arm; and means for moving the sheet at a timed speed past a point at which it may be marked by the marking arm.

2. Structure as specified in claim 1, in which: the lever-arm is moved in one direction by a traveling deformity, and is then released thereby; and in which the marking arm is operated when the lever-arm is thus released.

3. In recording apparatus for rotary well drilling rigs, said rigs including a string of drill stem, the combination of: a recording line connected to move longitudinally with said string during drilling operation, means capable of recording said longitudinal movement of the line, said means including a clock driven sheet, a rockably mounted arm, and means operated by the arm for making a mark on said sheet each time the arm is rocked; and means carried by the line for actuating said recording means, said means carried by the line including spaced deformations on the line, each adapted to engage and rock said arm as it passes the same; and means for biasing the arm to a normal unrocked position, whereby the arm will return to normal position after being rocked by a deformity.

4. In drilling recording apparatus for rotary well drilling rigs, the combination of: a recording line having one end connected with a well drilling tool string to move vertically therewith as the well is deepened; deformities carried by the line at measured spaced distances apart; a rockably mounted lever-arm mounted adjacent one extent of said line; a fork carried by the lever-arm and straddling said line in the path of said deformities, whereby the lever-arm is rocked each time a deformity moves the fork in a given direction; means including a break-joint in said lever-arm allowing said fork to pivot relative to said lever-arm without moving the lever-arm when a deformity moves the fork in a direction opposite to said given direction; means biasing the lever-arm to a normal unrocked position, whereby the lever-arm is returned to unrocked position after being deflected by a deformity; a movable sheet marking arm connected to said lever-arm, a movable sheet having time representing graduations thereon, said sheet having an extent lying in position to be marked by said marking arm, and means for moving the sheet at a timed speed past a point at which it may be marked by the marking arm.

5. In drilling recording apparatus for rotary well drilling rigs, the combination of: a recording line having one end connected with a well drilling tool string to move vertically therewith as the well is deepened, deformities carried by the line at measured spaced distances apart; a rockably mounted lever-arm mounted adjacent one extent of said line; a fork carried by the lever-arm and straddling said line in the path of said deformities, whereby the lever-arm is rocked each time a deformity moves the fork in a given direction; means including a break-joint in said lever-arm allowing said fork to pivot relative to said lever-arm without moving the lever-arm when a deformity moves the fork in a direction opposite to said given direction; means biasing the lever-arm to a normal unrocked position, whereby the lever-arm is returned to unrocked position after being deflected by a deformity; a movable sheet marking arm connected to said lever-arm, a movable sheet having time representing graduations thereon, said sheet having an extent lying in position to be marked by said marking arm, and means for moving the sheet at a timed speed past a point at which it may be marked by the marking arm, said marking arm including a marking member that is disposed in a non-marking position out of engagement with said sheet when the lever-arm is in said normal position and which is in a marking position in engagement with said sheet on overtravel of said lever-arm past said normal position after passage of each of said deformities.

6. A well drilling recorder adapted to be actuated by a line having spaced enlargements thereon, said enlargements being at known and preferably equally spaced distances apart, and said line having an axial motion proportional to the motion of a drill string whereby progress of the drill string is indicated by the passage of the enlargements, comprising actuating means including a rockably mounted portion, biasing means urging said portion to return to a normal unrocked position, said actuating means also including another portion, means connecting the first said portion to the second said portion to constrain the first said portion to move in one direction with the second said portion on motion of the second said portion in one direction and allowing motion of the second said portion in the opposite direction without causing motion of the first said portion, the second said portion including enlargement engaging means to be successively engaged and disengaged by said enlargements on motion of said line in one axial direction of motion thereof to cyclicly move the first said portion in said one direction thereof away from said normal position and allow it to return with one such cycle of motion of said member on passage of each of said enlargements, the first said portion being unresponsive to axial motion of said line in the opposite direction to said one direction, and means responsive to such cyclic motion of the first said portion to give a desired indication of the motion of said drill string.

7. A well drilling recorder adapted to be actuated by a line having spaced enlargements thereon, said enlargements being at known and preferably equally spaced distances apart, and said line having an axial motion proportional to the motion of a drill string whereby progress of the drill string is indicated by the passage of the enlargements, comprising actuating means including a rockably mounted portion, spring means biasing said member to a normal unrocked position upon displacement of said portion in either direction from said unrocked position, said actuating means also including another portion, means connecting the first said portion to the second said portion to cause the first said portion to move in one direction with the second said portion on motion of the second said portion in one direction and allowing motion of the second said portion in the opposite direction without causing motion of the first said portion, the second said portion including enlargement engaging means to be successively engaged and disengaged by said enlargements on motion of said line in one axial direction of motion thereof to cyclicly move the first said portion in said one direction thereof away from said normal position and allow it to return with one such cycle of motion of the first said portion on passage of each of said enlargements, the first said portion being unresponsive to axial motion of said line in the opposite direction to said one direction of motion thereof, and means actuated by the first said portion in each cycle during the overtravel thereof past said normal position upon said return motion thereof after said enlargement engaging means has disengaged from an enlargement to give a desired indication of the motion of said drill string.

8. A well drilling recorder adapted to be actuated by a line having spaced enlargements thereon, said enlargements being at known and preferably equally spaced distances apart, and said line having an axial motion proportional to the motion of a drill string whereby progress of the drill string is indicated by the passage of the enlargements, comprising actuating means including a rockably mounted portion, spring means biasing said member to a normal unrocked position upon displacement of said portion in either direction from said unrocked position, said actuating means also including another portion, means connecting the first said portion to the second said portion to cause the first said portion to move in one direction with the second said portion on motion of the second said portion in one direction and allowing motion of the second said portion in the opposite direction without causing motion of the first said portion, the second said portion including enlargement engaging means to be successively engaged and disengaged by said enlargements on motion of said line in one axial direction of motion thereof to cyclicly move the first said portion in said one direction thereof away from said normal position and allow it to return with one such cycle of motion of the first said portion on passage of each of said enlargements, the first said portion being unresponsive to axial motion of said line in the opposite direction to said one direction, and means actuated by the first said portion in each cycle during the overtravel thereof past said normal position upon said return motion thereof after said enlargement engaging means has disengaged from an enlargement to give a desired indication of the motion of said drill string, the last said means including a record sheet, and means to mark said sheet including a marker mechanically connected to the first said portion whereby some of the kinetic energy of the first said portion as it overtravels through said normal position on said return motion is imparted through said marker to said sheet to make an impression thereon.

References Cited in the file of this patent

UNITED STATES PATENTS

| | | |
|---|---|---|
| 538,240 | Crull | Apr. 30, 1895 |
| 1,846,912 | Sedgley | Feb. 23, 1932 |
| 1,988,785 | Dillon | Jan. 22, 1935 |
| 2,096,995 | Mizell | Oct. 26, 1937 |
| 2,147,344 | Horner | Feb. 14, 1939 |